(12) United States Patent
Gunter

(10) Patent No.: US 7,345,283 B2
(45) Date of Patent: Mar. 18, 2008

(54) FILTERED BACK-PROJECTION ALGORITHM FOR COMPTON TELESCOPES

(75) Inventor: Donald L. Gunter, Lisle, IL (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/543,383

(22) Filed: Oct. 4, 2006

(65) Prior Publication Data

US 2007/0145278 A1 Jun. 28, 2007

Related U.S. Application Data

(60) Provisional application No. 60/723,832, filed on Oct. 4, 2005.

(51) Int. Cl.
*G01T 1/00* (2006.01)
(52) U.S. Cl. .................................................. 250/369
(58) Field of Classification Search ........... 250/363.04, 250/366, 369, 370.1
See application file for complete search history.

(56) References Cited

U.S. PATENT DOCUMENTS

| 5,861,627 A * | 1/1999 | Basko et al. ........... 250/363.04 |
| 2002/0011571 A1* | 1/2002 | Lin et al. ..................... 250/366 |
| 2004/0251418 A1* | 12/2004 | Gunter ....................... 250/369 |

* cited by examiner

*Primary Examiner*—David Porta
*Assistant Examiner*—Mark R Gaworecki
(74) *Attorney, Agent, or Firm*—John P. Wooldridge; John H. Lee

(57) ABSTRACT

A method for the conversion of Compton camera data into a 2D image of the incident-radiation flux on the celestial sphere includes detecting coincident gamma radiation flux arriving from various directions of a 2-sphere. These events are mapped by back-projection onto the 2-sphere to produce a convolution integral that is subsequently stereographically projected onto a 2-plane to produce a second convolution integral which is deconvolved by the Fourier method to produce an image that is then projected onto the 2-sphere.

27 Claims, 1 Drawing Sheet

FILTERED BACK-PROJECTION ALGORITHM FOR COMPTON TELESCOPES

This application claims priority to U.S. Provisional Patent Application Ser. No. 60/723,832, titled: "A Filtered Back-Projection Algorithm for Compton Telescopes" filed Oct. 4, 2005, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to methods for imaging gamma rays, and more specifically, it relates to the use of filtered back-projection algorithms for gamma radiation imaging with Compton cameras.

2. Description of Related Art

Compton cameras were first proposed as a method of imaging gamma radiation in Todd et al., Nature 251, 132-134 (1974). During the 1970s and 1980, Manbir Singh and his group at USC attempted to build and produce images with a Compton camera. Their attempts were not very successful due to technical problems associated with the detectors and image reconstruction problems associated with the Compton "scatter cone." The events detected in a Compton camera define a scatter cone, but not the direction of the incident gamma ray. A mathematical reconstruction algorithm is required to convert information provided by the Compton camera into a source distribution. In Computed Tomography (CT), Single Photon Emission Tomography (SPECT), Positron Emission Tomogrpahy (PET) and Magnetic Resonance Imaging (MRI), the images are (generally) reconstructed using a class of (non-iterative) algorithms called filtered back-projection algorithms. However, Singh and his group were unable to find a filtered back-projection algorithm appropriate for Compton cameras. Instead, they began using iterative algorithms associated with maximum likelihood. These algorithms have the advantage that one need not perform detailed mathematical analysis of the imaging system, but are generally slow (due to iteration) and produce variable results (depending on stopping conditions and the numerical methods used). As a result of Singh's work, most researchers abandoned the search for a filtered back-projection algorithm for Compton cameras; maximum likelihood reconstructions were adopted as the standard in Compton camera research.

In the 1990s, a group headed by Les Rogers at the University of Michigan built a much more sophisticated Compton camera for medical imaging. Once again, iterative maximal-likelihood algorithms were used for the reconstruction. Furthermore, Rogers was assisted by a large group of experts in maximal-likelihood reconstruction at the University of Michigan headed by Jeff Fessler. Despite improved detector technology and the assembled expertise in iterative reconstruction, the images remained disappointing. Not only was the detector sensitivity too low for clinical applications, the (iterative) reconstruction required days of execution time on supercomputers. After this result, Compton cameras seemed to be a failed technology.

In the mid 1990s, however, a combination of new detector technology and more-sophisticated mathematics revived hopes for the Compton camera. The new technology involved solid-state detectors with improved energy and spatial resolution. (Energy resolution is crucial in Compton cameras because the "scatter cones" are determined by the energy deposition in the detectors.) More relevant, researchers began reexamining the Compton reconstruction algorithm. The filtered back-projection algorithms that had been abandoned by Singh and Rogers were revived by new mathematical insights. In 1994 Cree and Bonos published a paper (IEEE Trans on Medical imagining MI-13, 398-407 (1994)) that suggested that analytic inversion of the Compton reconstruction problem was possible. Shortly thereafter, Basko, Zeng, and Gullberg (Physics in Medicine and Biology 43, 887-894 (1996)) published a mathematical algorithm for Compton camera reconstruction that involved complicated sums of spherical harmonics. The major contribution of Basko et al. was the development of a rapid method for the evaluation of these summations. Basko et al. received U.S. Pat. No. 5,861,627 on this reconstruction technique in 1999. In 2000, Lucas Parra published a more mathematically rigorous inversion of the Compton camera reconstruction problem (IEEE Trans on Nuclear Science NS47, 1543-1550 (2000)). Once again, spherical harmonics were crucial in the analysis and, despite the greater rigor, Parra's technique relied on an infinite summation of spherical harmonics that was numerically slow and produced truncation errors when halted with only a finite number of terms. In 2002, T Tomitani and M. Hirasawa published a slightly different reconstruction algorithm (Physics in Medicine and Biology, 47, 2129-2145 (2002)) based, once again, on spherical harmonics. Unlike Parra, Tomitani and Hirasawa examined the truncation errors associated with termination of the infinite sum of spherical harmonics and demonstrated that the errors could be made small. In a second publication, Tomitani and Hirasawa (Physics in Medicine and Biology, 48, 1009-1029 (2003)) compensated for energy resolution errors and Doppler broadening—once again using spherical harmonic summations.

Since the 1970s, when the problem of Compton reconstruction was first studied, most researchers have decomposed the reconstruction into two parts. In the first part of the problem, the Compton camera is held in a fixed position with a source distribution (of gamma rays) located far away. In this part of the problem, one wants to determine the flux of incident radiation impinging on the camera from different directions. Because the Compton camera only provides information about the Compton scatter cone, one cannot assign a specific incident direction to individual events. However, if one accumulates enough events for a statistical analysis, one hopes to infer the distribution of incident gamma rays from the observed distribution of scatter cones. This part of the analysis can be called the "Compton telescope problem." Indeed, astrophysicists working on the COMTEL satellite data (IEEE Trans on Nuclear Science NS31, 766-770 (1984)) performed the first analysis of this problem and produced sky maps of gamma-ray sources on the celestial sphere. However, clinical applications in nuclear medicine require the second part of the reconstruction problem; namely, the Compton camera must be moved around the patient and the parallax information used to produce a 3D mapping of the gamma-ray emissions within the body. This second part of the problem is generally ignored because (it is argued) the standard filtered back-projection techniques of reconstruction algorithms described in the last paragraph are actually solutions of the Compton telescope problem.

Compton cameras were first proposed in the 1970s, but have never fulfilled their promise of imaging with gamma-rays because the image reconstruction techniques were inadequate. A method is therefore desirable to improve gamma-ray image reconstruction techniques for use with Compton cameras. The present invention provides such a method.

SUMMARY OF THE INVENTION

It is an object of the present invention to provide a method of converting Compton camera data into an intensity map of incoming radiation on the celestial sphere.

It is another object of the inventions to provide a computer-readable medium that includes computer code for reconstructing incident radiation flux from data produced by a fixed Compton camera.

Still another object is to provide a computer system comprising hardware and software, where the software includes computer program code for reconstructing incident radiation flux from data produced by a Compton camera.

These and other objects will be apparent based on the disclosure herein.

Each event in a Compton camera provides information that restricts the direction of the incident gamma-ray source to a cone. This Compton scatter cone is not sufficient for identification of an event with a specific direction of incidence. However, if one accumulates many events from an unchanging source distribution, one hopes to convert the statistical distribution of Compton cones into a statistical distribution of the incident radiation. The invention disclosed in this record of invention is a method for the conversion of such Compton camera data into a 2D image of the incident-radiation flux on the celestial sphere.

The entire Compton telescope problem is solved analytically without recourse to spherical harmonics by mapping the 2-sphere to the 2-plane. The integral equations describing the Compton telescope problem are transformed from the 2-sphere to the 2-plane using stereographic projection. The result of this analysis is that the standard back-projection technique produces a convolution integral on the 2-sphere (which all previous researchers had analyzed by spherical harmonics). However, when this convolution integral-equation is transformed to the 2-plane by stereographic projection, the result is once again a convolution integral-equation—but now on the 2-plane rather than the 2-sphere. This result is important because convolution integrals on the 2-plane can be inverted directly by Fourier transformations (whereas those on the 2-sphere cannot). Thus, the invention is an analytic inversion algorithm for the Compton telescope problem. However, stereographic projection causes divergences in the integrals over certain crucial functions (rendering the Fourier transforms ill-defined). Thus, a strategy was devised to eliminate these divergences. Basically, the stereographic projections map the sphere to the plane by projecting from an antipodal point on the sphere onto the plane. The antipodal point is mapped to infinity on the 2-plane. The divergences arise because scatter cones that intersect the antipodal point produce functions that do not die off appropriately at infinity in the 2-plane. The solution is the introduction of multiple (4) antipodal points located at the vertices of a tetrahedron, thereby decomposing the reconstruction into 4 separate back-projections. Each event must be assigned to a particular antipodal vector depending on the separation of the scatter cone from the antipodal direction. In this way, no scatter cone intersects an antipodal vector.

This invention thus provides image reconstruction for Compton cameras, which are gamma-ray detection devices. Such cameras can be used in astrophysics, radiation detection, localization of radioactive isotopes, and detection of gamma-emitting radionuclides. Other applications are found in nuclear power plants and homeland security. Commercial applications for the present invention are found in nuclear medicine. Currently gamma-ray cameras are used for diagnostic procedures in the nuclear medicine clinics of every hospital. Compton cameras can replace gamma-ray cameras as the major imaging device for clinics. Both the detector sensitivity and the reconstruction algorithm limit the feasibility of Compton camera in the clinic. The present method is crucial in solving the image reconstruction problem.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
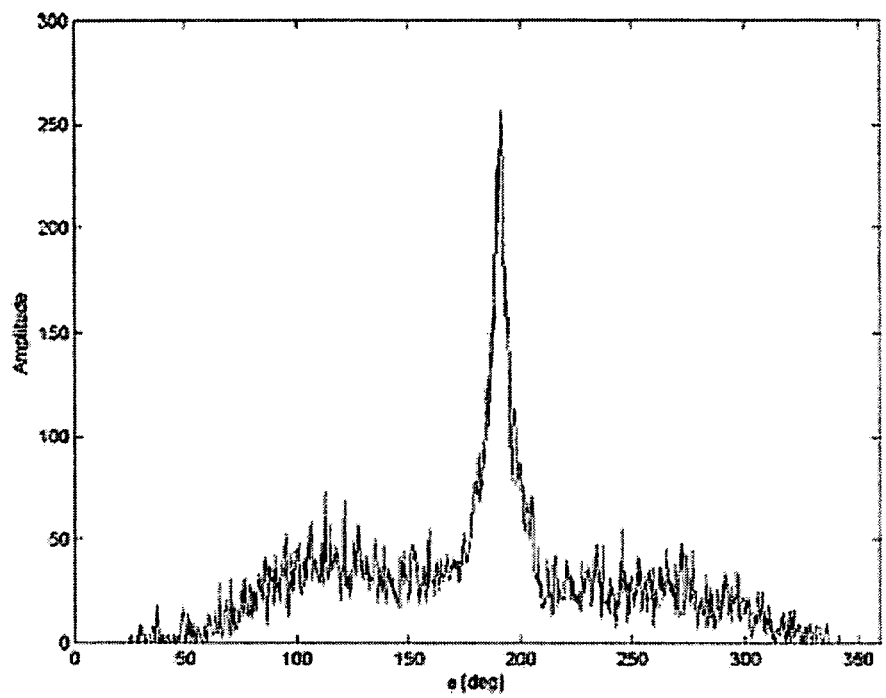
FIG. 1A is a cross-section of a back-projected image of a point source in mercator projection for a data acquisition containing 2700 events.
Figure 1B:
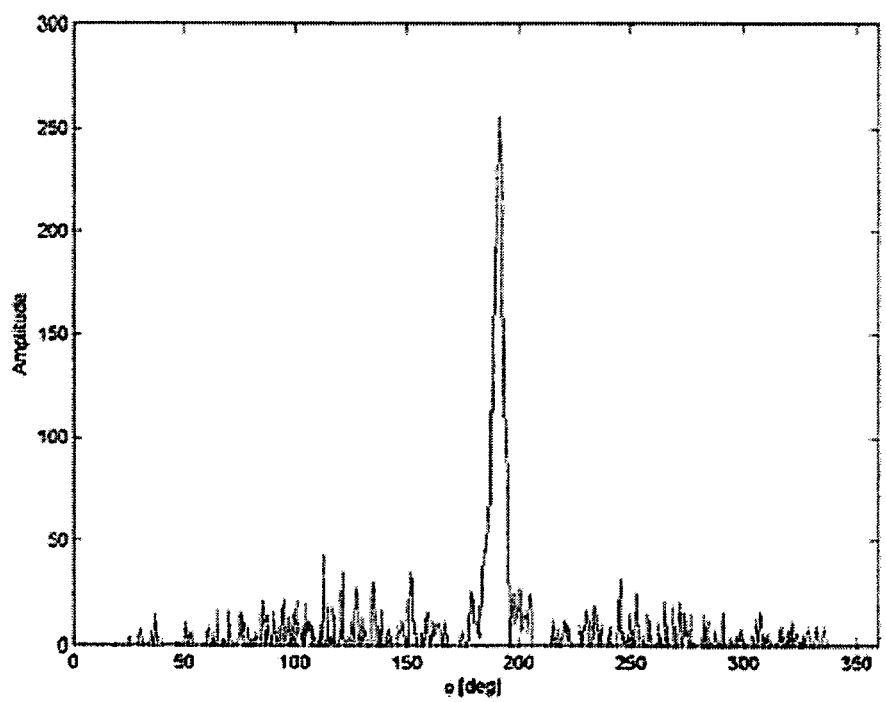
FIG. 1B is a reconstruction of the image of FIG. 1A using the proposed method.

A filtered back-projection algorithm reconstructs the incident radiation flux from the data produced by a fixed Compton camera. The incident flux of radiation from various directions on the celestial sphere produces coincident interactions within the camera. Each such event is mapped by back-projection onto a circle on the celestial sphere (the intersection of the Compton scatter cone with the sphere). The accumulation of these back-projected circles onto the sphere produces a back-projected image. The incident flux distribution and the back-projected image are related by a convolution integral on the sphere. Because Fourier methods are not directly applicable on the sphere, past analytical inversions have relied on spherical harmonic techniques; however, stereographic projection from the sphere onto a 2-plane yields another convolution integral equation that is invertible by Fourier methods, thereby avoiding spherical harmonics and permitting direct analytic inversion in the 2-plane. Once deconvolved in the 2-plane, the distribution is re-projected onto the sphere forming the flux distribution. The inversion requires a ramp filter in the stereographic projection plane; thus, it is no more ill-posed than the filtered back-projection algorithms used in CT and SPECT. Moreover, Fourier deconvolution permits straightforward deblurring of such effects as Doppler broadening. The algorithm has been demonstrated with data from a Compton camera. FIG. 1A is a cross-section of a back-projected image of a point source in mercator projection for a data acquisition containing 2700 events. FIG. 1B is a reconstruction of the image of FIG. 1A using the proposed method.

Beginning with the same imaging equation as Parra [1] and Tomitani and Hirasawa [2], the incident flux from the direction $\vec{\Omega}$ (i.e., the source distribution) is described by the distribution $f(\vec{\Omega})$. Compton events are characterized by the axis of the scatter cone $\vec{\omega}$ and cosine of the opening angle of the cone $\mu$. The Compton scatter events are characterized by the distribution function $g(\vec{\omega}, \mu)$. The distribution of the Compton data is related to the source distribution by the integral equation:

$$g(\vec{\omega}, \mu) = \int_{|\vec{\Omega}|=1} d^2\vec{\Omega} f(\vec{\Omega}) \delta(\mu - \vec{\Omega}\cdot\vec{\omega}). \quad (1)$$

The back-projection of this data is given by $$b(\vec{\Omega}) = \frac{1}{2\pi}\int_{|\vec{\omega}|=1}\int d^2\vec{\omega}\int_{-1}^{1}d\mu g(\vec{\omega},\mu)\delta(\mu-\vec{\Omega}\cdot\vec{\omega}). \quad (2)$$

Combining equations (1) and (2), one finds that b is related to f by $$b(\vec{\Omega}) = \int_{|\vec{\Lambda}|=1}\int d^2\vec{\Lambda} f(\vec{\Lambda}) \frac{1}{|\vec{\Omega}-\vec{\Lambda}|}. \quad (3)$$

Equation (3) is a convolution equation on the 2-sphere. The standard Fourier techniques that permit immediate inversion of convolution equations are not applicable on the 2-sphere; however, one can map the 2-sphere onto the 2-plane by stereographic projection ($\vec{\Omega} \leftrightarrow \vec{Z}$) where $$\vec{Z} = \frac{[\vec{\Omega}-(\vec{\xi}\cdot\vec{\Omega})\vec{\xi}]}{[1-(\vec{\xi}\cdot\vec{\Omega})]}; \vec{\Omega} = \frac{[2\vec{Z}+(|\vec{Z}|^2-1)\vec{\xi}]}{[|\vec{Z}|^2+1]} \quad (NB:\vec{Z}\cdot\vec{\xi}=0). \quad (4)$$

and where $|\vec{\xi}|=|\vec{\Omega}|=1$. The vector $\vec{\xi}$ corresponds to the antipodal point of the stereographic projection, that is $\vec{\Omega}=-\vec{\xi} \Rightarrow \vec{Z}=0; \vec{\Omega}\rightarrow\vec{\xi} \Rightarrow \vec{Z}\rightarrow\infty$.

If one defines $$B(\vec{Z}) = [|\vec{Z}|^2+1]^{-\frac{1}{2}} b\left(\frac{[2\vec{Z}+(|\vec{Z}|^2-1)\vec{\xi}]}{[|\vec{Z}|^2+1]}\right) \quad (5)$$

and $$F(\vec{Z}) = [|\vec{Z}|^2+1]^{-\frac{3}{2}} f\left(\frac{[2\vec{Z}+(|\vec{Z}|^2-1)\vec{\xi}]}{[|\vec{Z}|^2+1]}\right), \quad (6)$$

then one finds that equation (3) becomes $$B(\vec{Z}) = \int_{|\vec{X}|=1}\int d^2\vec{X} F(\vec{X}) \frac{1}{|\vec{Z}-\vec{X}|}, \quad (7)$$

where the integral is over the 2-plane. Consequently, one can Fourier transform B and F on the 2-plane and find that $$\tilde{F}(\vec{k})=|\vec{k}|\tilde{B}(\vec{k}) \quad (8),$$

where $\tilde{F}$ and $\tilde{B}$ are the Fourier transforms of F and B, respectively and the vector k is the spatial frequency vector associated with the Fourier transform in "z" 2-plane. Thus, a ramp filter deconvolves the backprojected image and gives the source distribution in the stereographic projection plane.

This simple geometric transformation (and subsequent inversion) is marred by one significant problem. If the functions f and b are non-vanishing at $\vec{\Omega}=\vec{\xi}$, then the functions F and B are not integrable and the Fourier transforms are undefined. In particular, if the antipodal direction $\vec{\xi}$ lies on one of the Compton scatter cones, then the function $b(\vec{\xi})\neq 0$ so that $\lim_{\infty} B(\vec{Z})=C/|\vec{Z}|$. The solution to this problem is straightforward and follows from two simple observations: (1) the antipodal vector can be chosen arbitrarily, and (2) more than one antipodal vector can be used.

The present strategy uses four antipodal vectors ($\vec{\xi}_i$, i=1–4) (located tetrahedrally). Each event is then classified by how closely the Compton cone approaches $\vec{\xi}_i$ and assigned to the antipodal vector furthest from the cone. Four back-projection functions are accumulated and analyzed independently. Afterwards, the four resulting source distributions are added together (note that both the integral equation and its inverse are linear operators). One needs (at least) four antipodal vectors because three vectors uniquely determine a cone. If one tried to use three antipodal vectors, there would always exist a cone that intersected all three and, thus, cause all three back-projection images to diverge. On the other hand, if one has four antipodal vectors arranged tetrahedrally, one avoids the problem because all the points on the scatter cone are mapped to points in the 2-plane that satisfy $|\vec{Z}|<3.1462$. Thus, the B associated with each antipodal vector has compact support This fact is also useful in the numerical implementation of the 2D FFT (required in equation 8) because one need not worry about the asymptotic behavior of B for large $|\vec{Z}|$.

A digital computer system can be programmed to perform the method of this invention. Once programmed to perform particular functions pursuant to instructions from program software that implements the method of this invention, such digital computer system in effect becomes a special-purpose computer particular to the method of this invention. The techniques necessary for this are well-known to those skilled in the art of computer systems.

Computer programs implementing the method of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses distribution media, intermediate storage media, execution memory of a computer, and any other medium or device capable of storing for later reading by a computer a computer program implementing the method of this invention.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A method for reconstructing image information from a Compton camera, comprising:
   obtaining observed event data from the Compton camera, wherein said observed event data results from a source distribution comprising a flux distribution;
   mapping said observed event data by backprojection to form a backprojection function on a 2-sphere;
   stereographically projecting said back-projection function from said 2-sphere onto a 2-plane to produce a projected back-projection function;
   Fourier transforming said projected back-projection function to produce a transformed back-projection function;
   deconvolving said transformed back-projection function with a ramp filter to obtain said source distribution on said 2-plane; and
   mapping said source distribution from said 2-plane back onto said 2-sphere.

2. The method of claim 1, further comprising:
   for each event of said observed event data, using multiple antipodal points to decompose the reconstruction into a corresponding number of separate back-projections.

3. The method of claim 2, wherein the use of multiple antipodal points to decompose the reconstruction includes:
   determining which of four antipodal points located at the vertices of a tetrahedron is furthest from the Compton cone, and assigning the event to the antipodal point furthest from the Compton cone;
   accumulating and assigning independently the four back-projection functions to produce four source distributions; and
   adding said four source distributions.

4. A method for reconstructing incident radiation flux from data produced by a fixed Compton camera, comprising:
   detecting interaction events within a Compton camera, wherein each event of said events comprises coincident gamma radiation flux arriving from various directions of a 2-sphere;
   mapping at least a portion of said events by back-projection onto said 2-sphere to produce a first convolution integral;
   stereographically projecting said first convolution integral onto a 2-plane to produce a second convolution integral;
   Fourier deconvolving said second convolution integral to produce a deconvolved image; and
   projecting said deconvolved image onto said 2-sphere to produce an intensity map on said 2-sphere.

5. The method of claim 4, wherein as part of the step of mapping, said events are mapped onto a circle onto said 2-sphere.

6. The method of claim 5, wherein a cone defined by an event and its corresponding back-projected circle defines a Compton cone.

7. The method of claim 4, wherein the step of Fourier deconvolving utilizes a ramp filter.

8. The method of claim 7, wherein the step of stereographically projecting further comprises projecting said first convolution integral from multiple antipodal points located at the vertices of a tetrahedron on said 2-sphere onto said 2-plane, wherein each said event is assigned to a particular antipodal vector depending on the separation of scatter cone from the antipodal direction such that no scatter cone intersects an antipodal vector.

9. The method of claim 4, wherein the step of stereographically projecting said first convolution integral onto a 2-plane to produce a second convolution integral comprises projecting said first convolution integral from at least one antipodal point on said 2-sphere onto said 2-plane, wherein the antipodal point is mapped to infinity on the 2-plane, wherein divergences arise because scatter cones that intersect said antipodal point do not die off at infinity in said 2-plane.

10. An improvement in a method for reconstructing incident radiation flux from data produced by a fixed Compton camera, the method comprising:
    detecting interaction events within a Compton camera, wherein each event of said events comprises coincident gamma radiation flux arriving from various directions of a 2-sphere; and
    mapping at least a portion of said events by back-projection onto said 2-sphere to produce a first convolution integral,
    the improvement comprising:
    stereographically projecting said first convolution integral onto a 2-plane to produce a second convolution integral;
    Fourier deconvolving said second convolution integral to produce a deconvolved image; and
    projecting said deconvolved image onto said 2-sphere to produce an intensity map on said 2-sphere.

11. The improvement of claim 10, wherein as part of the step of mapping, said events are mapped onto a circle onto said 2-sphere.

12. The improvement of claim 11, wherein a cone defined by an event and its corresponding back-projected circle defines a Compton cone.

13. The improvement of claim 10, wherein the step of Fourier deconvolving utilizes a ramp filter.

14. The improvement of claim 10, wherein the step of stereographically projecting said first convolution integral onto a 2-plane to produce a second convolution integral comprises projecting said first convolution integral from at least one antipodal point on said 2-sphere onto said 2-plane, wherein the antipodal point is mapped to infinity on the 2-plane, wherein divergences arise because scatter cones that intersect said antipodal point do not die off at infinity in said 2-plane.

15. The improvement of claim 13, wherein the step of stereographically projecting further comprises projecting said first convolution integral from multiple antipodal points located at the vertices of a tetrahedron on said 2-sphere onto said 2-plane, wherein each said event is assigned to a particular antipodal vector depending on the separation of scatter cone from the antipodal direction such that no scatter cone intersects an antipodal vector.

16. A computer-useable medium embodying computer program code for reconstructing incident radiation flux from data produced by a fixed Compton camera by executing the steps of:
    detecting interaction events within a Compton camera, wherein each event of said events comprises coincident gamma radiation flux arriving from various directions of a 2-sphere;
    mapping at least a portion of said events by back-projection onto said 2-sphere to produce a first convolution integral;

stereographically projecting said first convolution integral onto a 2-plane to produce a second convolution integral;

Fourier deconvolving said second convolution integral to produce a deconvolved image; and projecting said deconvolved image onto said 2-sphere to produce an intensity map on said 2-sphere.

17. The computer-useable medium of claim 16, wherein as part of the step of mapping, said events are mapped onto a circle onto said 2-sphere.

18. The computer-useable medium of claim 17, wherein a cone defined by an event and its corresponding back-projected circle defines a Compton cone.

19. The computer-useable medium of claim 16, wherein the step of Fourier deconvolving utilizes a ramp filter.

20. The computer-useable medium of claim 19, wherein the step of stereographically projecting further comprises projecting said first convolution integral from multiple antipodal points located at the vertices of a tetrahedron on said 2-sphere onto said 2-plane, wherein each said event is assigned to a particular antipodal vector depending on the separation of scatter cone from the antipodal direction such that no scatter cone intersects an antipodal vector.

21. The computer-useable medium of claim 16, wherein the step of stereographically projecting said first convolution integral onto a 2-plane to produce a second convolution integral comprises projecting said first convolution integral from at least one antipodal point on said 2-sphere onto said 2-plane, wherein the antipodal point is mapped to infinity on the 2-plane, wherein divergences arise because scatter cones that intersect said antipodal point do not die off at infinity in said 2-plane.

22. A computer system comprising hardware and software, wherein said software comprises computer program code for reconstructing incident radiation flux from data produced by a Compton camera by executing the steps of:

detecting interaction events within a Compton camera, wherein each event of said events comprises coincident gamma radiation flux arriving from various directions of a 2-sphere;

mapping at least a portion of said events by back-projection onto said 2-sphere to produce a first convolution integral;

stereographically projecting said first convolution integral onto a 2-plane to produce a second convolution integral;

Fourier deconvolving said second convolution integral to produce a deconvolved image; and projecting said deconvolved image onto said 2-sphere to produce an intensity map on said 2-sphere.

23. The computer system of claim 22, wherein as part of the step of mapping, said events are mapped onto a circle onto said 2-sphere.

24. The computer system of claim 23, wherein a cone defined by an event and its corresponding back-projected circle defines a Compton cone.

25. The computer system of claim 22, wherein the step of Fourier deconvolving utilizes a ramp filter.

26. The computer system of claim 25, wherein the step of stereographically projecting further comprises projecting said first convolution integral from multiple antipodal points located at the vertices of a tetrahedron on said 2-sphere onto said 2-plane, wherein each said event is assigned to a particular antipodal vector depending on the separation of scatter cone from the antipodal direction such that no scatter cone intersects an antipodal vector.

27. The computer system of claim 22, wherein the step of stereographically projecting said first convolution integral onto a 2-plane to produce a second convolution integral comprises projecting said first convolution integral from at least one antipodal point on said 2-sphere onto said 2-plane, wherein the antipodal point is mapped to infinity on the 2-plane, wherein divergences arise because scatter cones that intersect said antipodal point do not die off at infinity in said 2-plane.

* * * * *